Dec. 27, 1949     L. B. COURTOT     2,492,917

VALVE

Filed Feb. 18, 1946

INVENTOR.
Louis B. Courtot
BY
Richey & Watts
ATTORNEYS

Patented Dec. 27, 1949

2,492,917

UNITED STATES PATENT OFFICE 2,492,917

VALVE

Louis B. Courtot, Cleveland, Ohio, assignor to The Weatherhead Company, Cleveland, Ohio, a corporation of Ohio Application February 18, 1946, Serial No. 648,446

3 Claims. (Cl. 251—19)

1

This invention relates to a valve, more particularly to a valve adaptable for use as a drain cock such as that employed in the cooling system of automobile engines.

Drain cocks of the type employed in cooling systems are placed at the lowest point of the system so that all of the coolant may be emptied from the system. Since the drain cock is at the lowest point of the system sediment collects about the cock and if the valve has a shut off arrangement which is inaccessible and which offers restrictions or obstructions to the flow of fluid, the sediment may collect in that area and harden there so that the fluid will not drain off when the valve is opened. Accordingly, it is an object of my invention to provide a straight through path for the fluid free from restrictions and obstructions. This is accomplished by making the valve closure member largely external of the valve which facilitates cleaning out the valve passageway with a wire or other pointed object in the case of an obstruction and which eliminates the need for restrictions or other obstructions within the valve body passageway.

Prior drain cocks have customarily employed a tapered valve member lapped into a tapered seat in the valve body. This is a relatively expensive construction and it is an object of this invention to provide a drain cock which is simple and inexpensive to manufacture and which requires no closure fitting and carefully machined parts to produce a fluid tight joint.

The drain cocks in the prior art have been provided with valve handles which were circumferentially fixed to the valve body, making it difficult to machine threads so that the valve handle is accessible when the valve is screwed in place. It is another object of this invention to insure that the valve handle will always be accessible by making it possible to rotate the handle circumferentially to any desired position without affecting the valve's operation.

Other objects and advantages of my invention will appear as the following detailed description of a preferred embodiment thereof proceeds.

2

Figure 1:
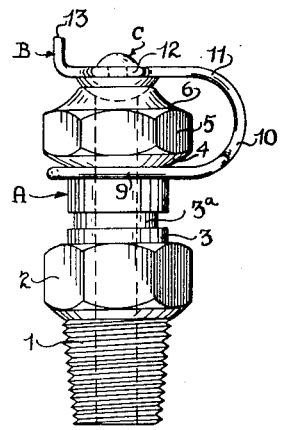
Fig. 1 is a view of the valve in its closed position.

Referring now to the drawings, it can be seen that the valve includes three major parts, namely, a valve body A, a valve clip B and a valve button C. The valve body A has an externally threaded portion 1 for attachment to the cooling system. A hexagonal portion 2 may be provided in order to receive a wrench or tool when the drain cock is fitted to the cooling system. The valve body is formed with a reduced cylindrical portion 3 which terminates in an axially inwardly facing abutment portion 4 the surface of which is a section of a sphere. A groove 3a may be formed in the cylindrical portion 3 of the valve body for purposes to be hereinafter described. A second hexagonal portion 5 may be provided, particularly if the valve body is made from a hexagonal stock. An axially outwardly facing, generally concave conical abutment surface 6 is machined on the valve body, this surface preferably being of toroidal section.

Figure 2:
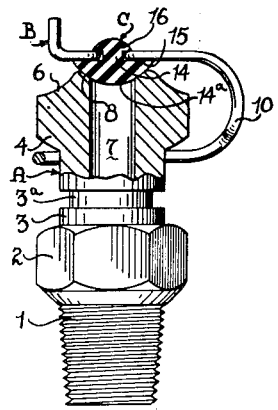
Fig. 2 is a partial cross-sectional view of the assembled valve.

Referring to Fig. 2 it can be seen that valve body A has a smooth axial passageway 7 terminating in a valve seat 8, the surface of which is a portion of a surface of revolution, preferably that of a sphere. The abutment surface 6 is radially outwardly of and merges with the valve seat 8.

Figure 3:
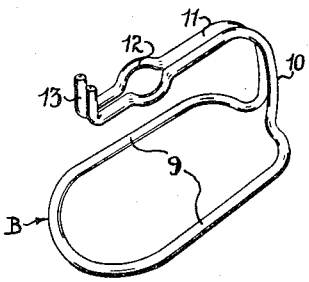
Fig. 3 is a view of one form of the valve clip member.

Fig. 3 is a perspective view of a preferred form of valve clip member B. This member is generally of U-shaped profile and is made of spring wire. One leg of the U-shaped member is formed as a loop portion 9 and merges with a generally vertical stem portion 10 which in turn merges with the other leg portion 11. The wires forming leg 11 are oppositely bent at 12 to form an eye for retention of the valve button and the terminal portions of the wires forming leg 11 are bent vertically as at 13 to serve as a handle.

As can be seen in Figs. 1 and 2, the loop portion 9 surrounds the reduced portion 3 of the valve body and is pulled into engagement with the spherical surface 4 of the valve body by the spring action of the wire. The width across the loop portion 9 is approximately equal to the diameter of the reduced portion 3 of the valve body whereas it is apparent that longitudinal dimension of loop 9 exceeds its width. Stem portion 10 of the clip member B clears the hexagonal portion 5 and is of such a length that the leg portion 11 which carries the valve button C forces the valve button firmly against the valve seat 8 in the valve body due to the engagement of loop 9 with abutment 4. As can be seen in Fig. 2, valve button C is made of natural or synthetic rubber or of some other flexible material. The button includes a body portion 14 having a surface 14a of the same configuration as that of valve seat 8 and a neck portion 15 which is received by the eye 12 of the valve clip. A head portion 16 retains the button within the valve clip.

Figure 4:
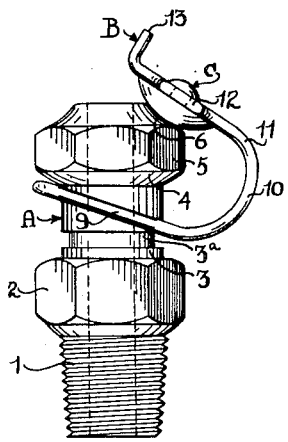
Fig. 4 is a view of the valve in its open position.

Fig. 4 is a general view of the valve in its open position. The valve is opened by grasping the handle 13 and swinging the clip member about the valve body until the surface 14a of the valve button engages the toroidal abutment surface 6 of the valve body. This locks the valve in its open position, the surface 6 being slightly concave to fit the valve button. The spherical surface 4 of the valve body permits the loop 9 to rock about it as the valve is opened, but the proportion of the parts is such that the legs 9 and 11 of the valve clip B will be separated further apart when the valve is opened than when it is closed. This firmly retains the valve in its open position.

Figure 5:
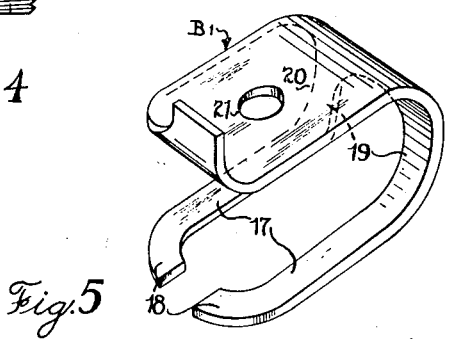
Fig. 5 illustrates a modified form of the valve clip member.

Fig. 5 shows a form of valve clip B₁ which may be used in place of the spring wire clip shown in Fig. 2. This form includes spaced arms 17 designed to surround the reduced portion 3 of the valve body. End portions 18 retain the clip on the valve body. Generally vertical portions 19 merge into the horizontal portion 20 which has an aperture 21 to receive the valve button. The vertical handle portion 22 is formed by turning up the end of the strip. This part should be made of flexible metal, preferably of spring steel. The groove 3a in the valve body permits the clip B₁ to be assembled on the body without excessive bending of the arm 17. This groove receives portion 18 of the clip during the assembly operation.

Having completed the description of my invention, it can be seen that I have provided a valve which has a straight through, smooth outlet passageway so that there is no tendency to collect sediment and obstruct the flow of fluid. Likewise, the valve closure member is external of the valve and any sediment which collects there can be readily removed when the valve is opened. Furthermore, the valve handle may be circumferentially turned to any convenient position and the valve will lock in both its opened and closed position. It can also be seen that the valve can be economically manufactured and that only the simplest turning operations are required for the valve body. Likewise, the valve clip and button assembly requires no accurate machining or fitting operations, it being much cheaper to produce this assembly than to produce the usual tapered valve member with a lapped or ground fit. Also, there is no chance for vibration to cause the valve to gradually work itself open because the spring wire will always firmly retain the valve button against the valve seat at pressures encountered in systems where such a drain cock is employed.

Those skilled in the art will appreciate that many modifications may be made without departing from the spirit of the invention; for example, the valve button C and its seat may have surfaces formed as a part of any surface of revolution such as an ellipsoid or other conic section, instead of the spherical surface illustrated. In fact, the valve seat may be formed as part of any suitable surface of revolution, as long as the valve button complements it. Of course, if the valve button C is so modified it would be desirable to generate the toroidal locking surface 6 in the same manner. The attaching means 1 for the valve can be varied from that shown in the figures in accordance with standard practice without modifying the spirit of the invention. Likewise, the exact configuration of the valve clip B is subject to variation without modifying its function. These and numerous other variations and modifications of similar nature can be made without departing from the spirit of the invention as defined in the appended claims.

Having thus described a preferred embodiment of the present invention so that others skilled in the art may be able to understand and practice the same, I state that what I desire to secure by Letters Patent is defined in what is claimed.

What is claimed is:

1. A valve comprising a valve body having an axially disposed passageway therethrough terminating in a valve seat, an axially outwardly facing abutment formed on said body and merging with said valve seat, an abutment formed on said body facing axially inwardly and away from said valve seat, said last-named abutment merging with an axially extending body portion of reduced section, a generally U-shaped, metallic member having spaced legs and a resilient portion connecting said legs, a rubber-like valve button mounted on one of said legs for engagement with said valve seat, the other of said legs having spaced arm portions embracing said reduced body section and resiliently pressed against said axially inwardly facing seat to hold the button against the valve seat, the longitudinal extent of said arms exceeding their spacing whereby said U-shaped member may be moved to a valve open position wherein said button is resiliently pressed against said axially outwardly facing abutment.

2. A valve comprising a valve body having an axially disposed passageway therethrough terminating in a valve seat, an axially outwardly facing, concave toroidal abutment surface formed on said body and merging with said valve seat, an abutment formed on said body facing axially inwardly and away from said valve seat, said last-named abutment merging with an axially extending body portion of reduced section, a generally U-shaped metallic member having spaced legs and a resilient portion connecting said legs, a rubber-like valve button mounted on one of said legs for engagement with said valve seat, the other of said legs having spaced arm portions embracing said reduced body section and resiliently pressed against said axially inwardly facing seat to hold the button against the valve seat, the longitudinal extent of said arms exceeding their spacing whereby said U-shaped member may be moved to a valve open position wherein said button is resiliently pressed against said axially outwardly facing abutment.

3. A valve comprising a valve body having an axially disposed passageway therethrough terminating in a valve seat, an axially outwardly facing, concave toroidal abutment surface formed on said body and merging with said valve seat, an abutment formed on said body facing axially inwardly and away from said valve seat, said last-named abutment having a convex surface of revolution merging with an axially extending body portion of reduced section, a generally U-shaped metallic member having spaced legs and a resilient portion connecting said legs, a rubber-like valve button mounted on one of said legs for engagement with said valve seat, the other of said legs having spaced arm portions embracing said reduced body section and resiliently pressed against said axially inwardly facing seat to hold the button against the valve seat, the longitudinal extent of said arms exceeding their spacing whereby said U-shaped member may be moved to a valve open position wherein said button is resiliently pressed against said axially outwardly facing abutment.

LOUIS B. COURTOT.

REFERENCES CITED

The following references are of record in the file of this patent:

UNITED STATES PATENTS

| Number | Name | Date |
|---|---|---|
| 1,052,228 | Eder | Feb. 4, 1913 |
| 1,581,941 | Martin | Apr. 20, 1926 |
| 1,743,293 | Toft | Jan. 14, 1930 |
| 1,951,510 | Goldberger | Mar. 20, 1934 |
| 2,016,678 | Loomis | Oct. 8, 1935 |
| 2,030,609 | Quittner | Feb. 11, 1936 |
| 2,041,488 | Robinson | May 19, 1936 |
| 2,044,837 | Davis | June 23, 1936 |